United States Patent [19]

Buysch et al.

[11] Patent Number: 5,324,776

[45] Date of Patent: Jun. 28, 1994

[54] PROCESS FOR THE PREPARATION OF POLYMERS CONTAINING AMINO GROUPS

[75] Inventors: Hans-Josef Buysch, Krefeld; Klaus Szablikowski, Walsrode, both of Fed. Rep. of Germany

[73] Assignee: Wolff Walsrode AG, Walsrode, Fed. Rep. of Germany

[21] Appl. No.: 16,334

[22] Filed: Feb. 11, 1993

[30] Foreign Application Priority Data

Feb. 21, 1992 [DE] Fed. Rep. of Germany ....... 4205280

[51] Int. Cl.$^5$ .................. C08B 15/06; C08B 31/04; C08B 37/00; C08F 8/30
[52] U.S. Cl. .................. 525/54.21; 525/54.24; 525/58; 525/123; 525/127; 525/128; 525/452
[58] Field of Search .............. 525/54.21, 54.24, 58, 525/123, 127, 128, 452; 527/300, 400; 528/44, 368, 369, 85

[56] References Cited

U.S. PATENT DOCUMENTS 4,806,611 2/1989 Hönel et al. .................. 528/370
4,808,658 2/1989 Walz et al. ................... 528/73

FOREIGN PATENT DOCUMENTS 0367003 5/1990 European Pat. Off. .

Primary Examiner—Nathan M. Nutter
Attorney, Agent, or Firm—Sprung Horn Kramer & Woods

[57] ABSTRACT

The present invention relates to a process for the preparation of polymers containing amino groups, wherein OH-functional polymers are reacted with aminourethanes of the general formula I

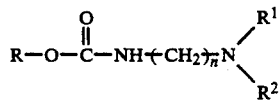

in which
R represents $C_1$–$C_6$alkyl, $C_5$ and $C_6$ cycloalkyl, benzyl, 2-hydroxyethyl, 2-hydroxypropyl, aryl,
$R^1$ and $R^2$ are identical or different and have the same meaning as R, and in addition cyanoethyl, or together with the N atom represent a 5- or 6-membered ring, optionally with a further N or O atom, and n is an integer from 0 to 12.

1 Claim, No Drawings

PROCESS FOR THE PREPARATION OF POLYMERS CONTAINING AMINO GROUPS

The present invention relates to a process for the preparation of polymers containing amino groups by reacting OH-functional polymers with aminourethanes of the general formula I

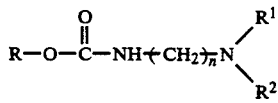

in which
R represents $C_1$–$C_6$ alkyl, $C_5$ and $C_6$ cycloalkyl, benzyl, 2-hydroxyethyl, 2-hydroxypropyl, aryl
$R^1$ and $R^2$ are identical or different and represent $C_1$–$C_6$ alkyl, $C_5$ and $C_6$ cycloalkyl, benzyl, 2-hydroxyethyl, 2-hydroxypropyl, cyanoethyl, aryl, or together with the N atom a 5- or 6-membered ring, optionally with a further N or O atom, and n is an integer from 0 to 12.

It is known that OH-functional polymers may be converted into those with amino groups. Hitherto, the preparation of these products has only been solved unsatisfactorily. The proposed methods generally lead to very low degrees of substitution (DS).

According to EP-A 367 003 (see also the literature cited therein) highly substituted polysaccharides may be obtained, but this requires three polymer-analog reactions to be successively performed with isolation of the products, along with the corresponding expenditure on material, time and working up.

It has now been found that OH-functional polymers may be reacted in a simple manner with aminourethanes of the formula I to give polymers carrying amino groups, wherein the reaction proceeds unambiguously, with high reagent yields and without the simultaneous use of large amounts of auxiliary reagents.

Suitable OH-functional polymers are e.g. polyvinylalcohols, polyacrylates, which are prepared using monomers carrying OH groups such as β-hydroxyethyl (meth)acrylate, but especially polysaccharides, starches, dextrins, glycogens, polyglucosanes such as cellulose and its derivatives, e.g. methyl cellulose, hydroxyethyl cellulose, hydroxypropyl cellulose, mixed cellulose ethers such as methylhydroxyethyl celluloses, methylhydroxypropyl cellulose, sulphoethylcarboxymethyl cellulose, methylsulphoethyl cellulose, hydroxyethylsulphoethyl cellulose, dihydroxypropyl cellulose, dihydroxypropylhydroxyethyl cellulose, dihydroxypropylcarboxymethyl cellulose, carboxymethyl cellulose, their esters and salts with sodium, potassium, calcium and ammonium ions, carboxymethylhydroxyethyl cellulose, cellulose sulphate, polyfructosanes such as inulin and graninin, polymannosanes, polygalactosanes, and mixed polysaccharides such as hemicelluloses, and further polyxylosanes polyarabinosanes and also heteropolysaccharides such as gellane, xanthane and pullulane.

Preferred are cellulose and its derivatives, starch and dextrins, especially preferred are cellulose, methyl cellulose, hydroxyethyl cellulose, hydroxypropyl cellulose and starch.

Suitable aminourethanes are those of formula I

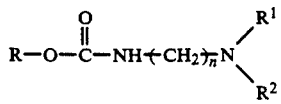

in which
R represents $C_1$–$C_6$ alkyl, preferably $C_1$–$C_4$ alkyl, especially preferably methyl and ethyl, $C_5$ and $C_6$ cycloalkyl, preferably cyclohexyl, benzyl, 2-hydroxyethyl, 2-hydroxypropyl or phenyl, preferably 2-hydroxyethyl
$R^1$ and $R^2$ are identical or different and the same as R, in addition cyanoethyl or together with the N atom represent a 5- or 6-membered ring, optionally with a further N or O atom, and n is an integer from 0 to 12, preferably 2 to 10, especially preferably 2 to 6.

Examples which may be mentioned are

N-(N,N-dimethylaminopropyl)-O-phenyl urethane*
N-(N,N-diethylaminopropyl)-O-phenyl urethane*
N-(N,N-dimethylaminoethyl)-O-phenyl urethane*
N-(N,N-dimethylaminopropyl)-O-methyl urethane*
N-(N,N-dimethylaminopropyl)-O-ethyl urethane*
N-(N,N-dimethylaminopropyl)-O-butyl urethane*
N-(N,N-diethylamino-ethyl)-O-(2-hydroxyethyl) urethane
N-[N,N-bis(2-hydroxyethyl)-aminopropyl]-O- methyl urethane*
N-[N,N-bis-(2-hydroxypropyl)-aminoethyl]-O-(2-hydroxyethyl) urethane
N-(N,N-dimethylamino-hexyl)-O-phenyl urethane
N-(N,N-dimethylamino)-O-phenyl urethane
N-[N,N-(2-hydroxyethyl)-methylamino]-O-(2-hydroxypropyl) urethane
N-(N,N-dimethylaminopropyl)-O-(2-hydroxyethyl) urethane*
N-(N,N-dimethylaminopropyl)-O-(2-hydroxyethyl) urethane*
N-(piperidino-propyl)-O-phenyl urethane
N-(pyrrolidino-propyl)-O-phenyl urethane
N-(morpholino-propyl)-O-phenyl urethane*
N-(morpholino-propyl)-O-(2-hydroxyethyl) urethane*

* These are preferred compounds.

These urethanes are prepared by methods known per se by reacting the corresponding carbonate with primary-tertiary diamines in accordance with the following reaction equation:

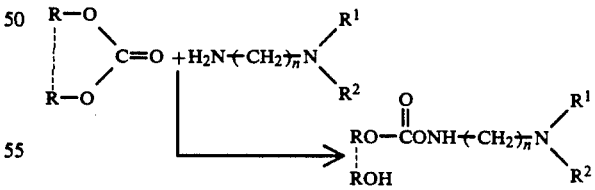

These types of reaction are described for example in U.S. Pat. No. 2,802,022 or EP-A 1 603.

The urethanes may be used in the reaction with polymers with functional OH groups either in purified form, following crystallisation or distillation, or as a crude product optionally together with the hydroxy compound produced during formation from the carbonate.

However, it is also possible to produce the aminourethanes from amines and carbonates in situ in the presence of the polymers with functional OH groups. This is of particular advantage when polysaccharides are to be reacted which have to be digested by swelling before reaction in order to make the OH groups accessible to the reagents. This type of digestion process may be advantageously, performed with amines (see Ullmann's Encyclopedia, 5th Ed, Vol. A5, page 384).

Thus the reaction with polysaccharides may be organised in such a way that the polysaccharide is first treated and digested with sufficient amounts of the primary-tertiary diamine, optionally separating out excess diamine by squeezing, centrifuging, filtering or distilling, then the polysaccharide is added to the amount of carbonate which is equivalent to the amount of diamine still contained therein, enabling the formation of a urethane and then reaction with the polysaccharide to proceed.

The amount of diamine is 0.1 to 100-fold, preferably 0.2 to 50-fold, in particular 0.3 to 30-fold the weight of polysaccharide. The time of action depends on the particular polysaccharide. It may be from a few minutes to several hours and in specific cases may be readily determined in preliminary tests.

The reaction of aminourethanes of the formula I with polymers containing functional OH groups takes place in solution or dispersion, wherein the polysaccharides are preferably used in suspension, because they form very viscous solutions which only permit low concentrations of solids and therefore require large reaction volumes and elaborate working up. The reaction may also take place, however, in the absence of a solvent or dispersant, wherein the aminourethane itself acts as the reaction medium. Suitable solvents and dispersants are inert under the reaction conditions. Examples which may be mentioned are hydrocarbons such as cyclohexane, pentane, heptane, isooctane, benzene, toluene, halogenated hydrocarbons such as methylene chloride, chloroform, dichloroethane, trichloroethylene, ethers such as diethyl, diisopropyl, dibutyl ether, dioxane, anisole, dimethoxyethane, esters such as ethyl acetate, butyl acetate, ethyl propionate, ethyl benzoate, ketones such as acetone, methylethyl ketone, diethyl ketone, methylisopropyl ketone, cyclohexanone, acetophenone, amides such as dimethylformamide, dimethylacetamide, tetramethylurea, N-methylpyrrolidone, N-methylcaprolactam, nitriles such as acetonitrile, propionitrile, benzonitrile, $\beta$-methoxypropionitrile and $\beta$-cyano-$\beta'$-methoxy-diethyl ether.

The reaction temperature is 30 to 150° C., preferably 40 to 140° C., particularly 50 to 130° C.

The starting materials and solvent or dispersant should in principle be anhydrous, so that as few as possible side reactions of aminourethanes and water take place.

The OH-functional polymer is generally reacted together with the aminourethane in the corresponding medium or the aminourethane is metered in as such or dissolved in a solvent, wherein one and the same medium may be used both for the polymer-analog reaction and for the aminourethane. The reaction time is between 30 minutes and several hours.

Reaction of the aminourethanes with the OH-functional polymers may be performed with or without catalysts. Catalysts which are used are the catalysts normally used for transesterifications or for forming urethanes from isocyanates and alcohols, in the recommended amounts (see Houben-Weyl, vol. E 20, 1604 et. seq. 1987). Particularly preferred catalysts are organic tin compounds such as dibutyltin dilaurate or tin dilaurate, titanium compounds such as titanium tetrabutylate, zinc compounds such as zinc acetate or alkali metal compounds such as KOH or $K_2CO_3$ or lead compounds such as lead acetate.

The molar ratio of one polymer unit with 1 OH function to aminourethane is generally 1:0.1 to 1:100, preferably 1:0.5 to 1:80, particularly preferably 1:0,8 to 1:50. During the reaction, the hydroxy compound being released may be distilled off or may remain in the reaction mixture.

After reaction of the OH-functional polymers with the aminourethane of formula I, the polymer containing aminourethane may be isolated and purified, or it may also be directly reacted further, for example with alkylating agents to give ammonium compounds. Isolation takes place by filtration or centrifuging of the suspension. Purification takes place by washing with the solvent which was used or another solvent, wherein alcohols may also be used, wherein an excess of the aminourethane which was optionally used may no longer be used.

OH-functional polymers with high degrees of substitution may be prepared by the process according to the invention in a reaction which proceeds unambiguously with high reagent yields.

Polymers containing amino groups are of interest as ion-exchange materials, as deposits for drugs and, after alkylation to give polymers carrying ammonium groups, as cationic auxiliary agents for the manufacture of paper, for the preparation of highly active filter materials, which are used in the medical field and in the food industry, and also as additives for hygienic and cosmetic cleansing and conditioning agents and as flocculating agents for purifying waste water.

EXAMPLE 1

102 g (1 mol) of 1-dimethylaminopropyl-3-amine was added dropwise to 214 g (1 mol) of diphenyl carbonate at 80° C. over the course of 1 hour, stirring was continued for another hour at 80 to 90° C. and 91 g of phenol was distilled off at about 100° C. and 0.4 mbar. A virtually colourless product (222 g) was obtained, still contaminated slightly with phenol, which had the characteristic strong urethane band at 1741 cm$^{-1}$ in the NMR spectrum.

EXAMPLE 2

102 g (1 mol) of 1-dimethylaminopropyl-3-amine was added dropwise to 88 g (1 mol) of ethyleneglycol carbonate at 50° C. over the course of 1 hour and stirring was continued for 2 hours at 70° C. Reaction was then complete. The colourless product had a strong urethane band at 1700 cm$^{-1}$ in the NMR spectrum. It could be used directly for reaction with polymers containing functional OH groups.

EXAMPLE 3

88 g (1 mol) of dimethylaminoethyl-2-amine was added dropwise to 152 g (1 mol) of methylphenyl carbonate at 80° C. over the course of 1 hour, stirring was continued for 2 hours at 100° C. and a virtually colourless aminourethane mixed with phenol was obtained.

Reacting aminourethanes with polymers containing functional OH groups.

EXAMPLE 4

100 g of a hydroxyethyl cellulose with a DS of 1.1, 100 g of the aminourethane from example 1 and 0.5 g of Desmorapid SO* were stirred for 5 to 6 hours at 100 to 120° C. After washing several times with isopropanol and drying under vacuum, 115 g of a polysaccharide containing amino groups and having a nitrogen content of 4.9% and a urethane band at 1725 cm$^{-1}$ were obtained.

* Commercially available tin catalyst from Bayer AG for reacting isocyanates with alcohols.

EXAMPLE 5

100 g of a hydroxyethyl cellulose with a DS of 1.1, 500 g of the aminourethane from example 2 and 1.0 g of Desmorapid SO were heated for 4 hours at 100° C. and the resulting ethylene glycol was then rapidly distilled off at 1 to 2 mbar with an overhead temperature of about 70° C. The bottom product was squeezed out while still hot and washed thoroughly with isopropanol several times. After drying under vacuum at 50° C., 122 g of an aminopolysaccharide with a nitrogen content of 6.3% were obtained.

EXAMPLE 6

Example 5 was repeated, 2 g of titanium tetrabutylate being added as catalyst instead of Desmorapid, and 113 g of a basic polysaccharide with a nitrogen content of 5.4% were obtained.

EXAMPLE 7

100 g of a hydroxyethyl cellulose with a DS of 1.1, 500 g of the aminourethane from example 1 and 1.0 g of Desmorapid SO were reacted at 110° C. for 4 hours, the resulting phenol being distilled off. The residue was washed several times with isopropanol and dried under vacuum, and 176 g of a basic polysaccharide with a nitrogen content of 10.3% and a strong urethane band at 1723 cm$^{-1}$ were obtained.

EXAMPLE 8

Repeating example 7 with 800 g of aminourethane and a reaction time of 8 hours yielded a polysaccharide (197 g) with a nitrogen content of 12.5%.

EXAMPLE 9

On repeating example 7 with 600 g of aminourethane and 1.0 g of KOH as catalyst, a polysaccharide (179 g) with a nitrogen content of 11.1% was obtained.

EXAMPLE 10

Repeating example 7 with 600 g of aminourethane and 1 g of titanium tetrabutylate as catalyst produced a basic polysaccharide (185 g) with a nitrogen content of 11.7%.

EXAMPLE 11

60 g of the basic polysaccharide from example 7 were suspended in 300 ml of toluene and 60 g of dimethyl sulphate were added dropwise over the course of 30 minutes. After stirring for 15 hours at 30 to 35° C., the mixture was filtered off under suction, washed several times with toluene and isopropanol and dried. A cationic, water-soluble polysaccharide (84 g) with a nitrogen content of 6.2% and a sulphur content of 6.8% was obtained.

We claim:

1. A process for the preparation of polymers containing amino groups, which comprises reacting OH-functional polymers with aminourethanes of the formula

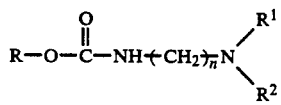

in which
R represents $C_1$-$C_6$ alkyl, $C_5$ and $C_6$ cycloalkyl, benzyl, 2-hydroxyethyl, 2-hydroxypropyl, or phenyl,
$R^1$ and $R^2$ are identical or different and have the same meaning as R, and in addition cyanoethyl, or together with the N atom represent a 5- or 6-membered ring which optionally contains a further N or O ring atom, and
n is an integer from 0 to 12.

* * * * *